US011075751B2

(12) United States Patent
Whytock et al.

(10) Patent No.: US 11,075,751 B2
(45) Date of Patent: Jul. 27, 2021

(54) MODULAR VALUABLE MEDIA RECYCLING DEVICE

(71) Applicant: NCR Corporation, Duluth, GA (US)

(72) Inventors: Alexander William Whytock, Perthshire (GB); Scott Low Colston, Dundee (GB); Ross Johnston, Leven (GB); Craig Scott Nicol, Inchture (GB); Anthony James Storey, Stonehaven (GB)

(73) Assignee: NCR Corporation, Atlanta, GA (US)

( * ) Notice: Subject to any disclaimer, the term of this patent is extended or adjusted under 35 U.S.C. 154(b) by 303 days.

(21) Appl. No.: 15/963,279

(22) Filed: Apr. 26, 2018

(65) Prior Publication Data

US 2019/0334712 A1   Oct. 31, 2019

(51) Int. Cl.
| | |
|---|---|
| *H04L 9/08* | (2006.01) |
| *H04L 9/32* | (2006.01) |
| *G06F 11/30* | (2006.01) |
| *G06F 12/14* | (2006.01) |
| *G07F 19/00* | (2006.01) |

(52) U.S. Cl.
CPC .......... *H04L 9/0866* (2013.01); *G07F 19/205* (2013.01); *G07F 19/211* (2013.01); *H04L 9/3242* (2013.01)

(58) Field of Classification Search
CPC ... H04L 9/0866; H04L 9/3242; G07F 19/205; G07F 19/211
See application file for complete search history.

(56) References Cited

U.S. PATENT DOCUMENTS

| | | | | |
|---|---|---|---|---|
| 6,131,809 | A * | 10/2000 | Drescher ............... | G07F 19/20 235/379 |
| 6,311,165 | B1 * | 10/2001 | Coutts ................. | G06Q 20/1085 235/379 |
| 7,309,004 | B1 * | 12/2007 | Muschellack ........ | G06Q 20/042 235/379 |
| 7,602,909 | B1 * | 10/2009 | Shields ............... | H04L 63/0428 380/42 |
| 7,721,951 | B1 * | 5/2010 | Parsons .............. | G06Q 20/3825 235/379 |
| 8,608,057 | B1 * | 12/2013 | Crews ................. | G07F 19/206 235/379 |
| 10,109,160 | B1 * | 10/2018 | Blower ............... | G07D 11/14 |
| 2002/0066020 | A1 * | 5/2002 | Whytock .............. | G07F 19/20 713/191 |

(Continued)

*Primary Examiner* — Darshan I Dhruv
(74) *Attorney, Agent, or Firm* — Schwegman, Lundberg & Woessner

(57) ABSTRACT

A modular valuable media recycling device is presented. The valuable media recycling device includes a media infeed module, a validator module, an escrow module, a plurality of media feeder/stacking modules, and a plurality of cassette modules. When a module handles a valuable media item along a media transport path, the module's identifier and security information are passed as a message to a next module that is to handle the media item in a processing path for the media item. Each module independently validates the authenticity of the message received from a previous module. The number of media feeder/stacking modules and cassette modules are scalable based on the transaction terminal that the modular valuable media recycling device is integrated into.

18 Claims, 19 Drawing Sheets

(56) References Cited

U.S. PATENT DOCUMENTS

| | | | | |
|---|---|---|---|---|
| 2003/0070080 A1* | 4/2003 | Rosen | G06Q 20/06 | 713/187 |
| 2003/0168508 A1* | 9/2003 | Daellenbach | G06Q 20/18 | 235/379 |
| 2004/0212142 A1* | 10/2004 | Graef | G06Q 20/0425 | 271/121 |
| 2006/0212407 A1* | 9/2006 | Lyon | G06Q 20/4016 | 705/71 |
| 2007/0276754 A1* | 11/2007 | Parmelee | G06Q 99/00 | 705/43 |
| 2010/0052237 A1* | 3/2010 | Herczeg | G07F 19/20 | 271/3.16 |
| 2011/0093116 A1* | 4/2011 | Nunn | G07D 11/14 | 700/219 |
| 2014/0081874 A1* | 3/2014 | Lewis | G07F 19/202 | 705/72 |
| 2014/0083814 A1* | 3/2014 | Nomura | G07D 11/17 | 194/206 |
| 2014/0166744 A1* | 6/2014 | Crews | G06Q 20/10 | 235/379 |
| 2014/0222672 A1* | 8/2014 | Christophersen | G06Q 20/1085 | 705/43 |
| 2015/0068863 A1* | 3/2015 | Blower | G07F 1/044 | 194/202 |
| 2015/0379491 A1* | 12/2015 | Ma | G07F 19/209 | 235/379 |
| 2016/0226863 A1* | 8/2016 | Wotherspoon | G06Q 20/18 | |
| 2017/0103621 A1* | 4/2017 | Beskitt | G07F 19/205 | |
| 2018/0137486 A1* | 5/2018 | Nikkel | H04L 9/3242 | |
| 2018/0204423 A1* | 7/2018 | Mizuno | G07D 11/00 | |
| 2018/0211253 A1* | 7/2018 | Ishikawa | G06Q 20/401 | |
| 2018/0233000 A1* | 8/2018 | Lee | G06Q 20/401 | |
| 2018/0300720 A1* | 10/2018 | Tanaka | G07F 19/20 | |
| 2019/0164388 A1* | 5/2019 | Ozasa | G07F 19/21 | |
| 2020/0250640 A1* | 8/2020 | Kuchenski | G07F 19/201 | |

* cited by examiner

| # | Name | Path | Notes |
|---|------|------|-------|
| 1 | Deposit to Lower | 1 → 3 → 17 → 18 | Diagnostic Operation |
| 2 | Desposit to Escrow | 1 → 2 → 8 → 9 → 10 → 11 | Normal Operation |

| # | Name | Path | Notes |
|---|---|---|---|
| 1 | Dispense to Escrow | 4 → 5 → 8 → 9 → 10 → 11 | Normal Operation |
| 2 | Dispense to IO | 4 → 5 → 8 → 9 → 12 → 13 → 14 → 15 | |

MODULAR VALUABLE MEDIA RECYCLING DEVICE

BACKGROUND

Media handling devices, particularly Automated Teller Machines (ATMs) include a variety of independent devices integrated into the ATM. The cash handling components are frequently a target by criminals, since these components have cash that the criminals want to steal out of the ATM.

The ATM includes a variety of cooperating processors for the various integrated components. Security is of utmost concern and still there are a number of vulnerable operations that expose the cash handing components to unauthorized access by criminals. Two such sensitive operations are dispensing cash/notes and depositing cash/notes both of which require user authentication to be performed on the ATM. For example, a recycler (component having cash/notes) must authenticate for deposit and dispense operations using cryptographic keys and cryptographic techniques.

However, the cryptographic techniques and keys are exposed in varying levels of degree within the components of the ATM during the authentication process by the recycler. The techniques and keys are also exposed during ATM maintenance and during remote software loading/installation at the ATM.

Furthermore, the components transport the media between one another on transport belts, which presents another opportunity for thieves to add a component or remove a component for purposes of intercepting cash.

In addition, the components are not interchangeable or expandable to work with new components that may desired. That is, the components are centrally controlled and pre-configured to work with one another, such that removing or adding components require redesign of the ATM and the software that controls the components whenever new components are added or some components are removed from the ATM.

A significant amount of resources have been directed to reducing the exposure level of the cryptographic techniques and keys within ATMs. However, the criminals are ingenious and are continually evolving to change tactics based on industry adjustments to the design and operation of the ATMs.

SUMMARY

In various embodiments, a modular valuable media recycling device and methods for operating a modular valuable media recycling device are provided.

According to an embodiment, a modular valuable media recycling device is provided. The modular valuable media recycling device including a plurality of modules. Each module including its own Printed Circuit Board having at least one hardware processor. Each hardware processor configured to execute firmware instructions that: i) activate electromechanical components to handle valuable media being processed with a transaction through the valuable media modular recycling device, ii) validate received security message from a previous module that handled the valuable media for the transaction, and iii) generate unique security messages that are independently validated by next modules that are to handle the valuable media for the transaction.

DETAILED DESCRIPTION

Figure 1:
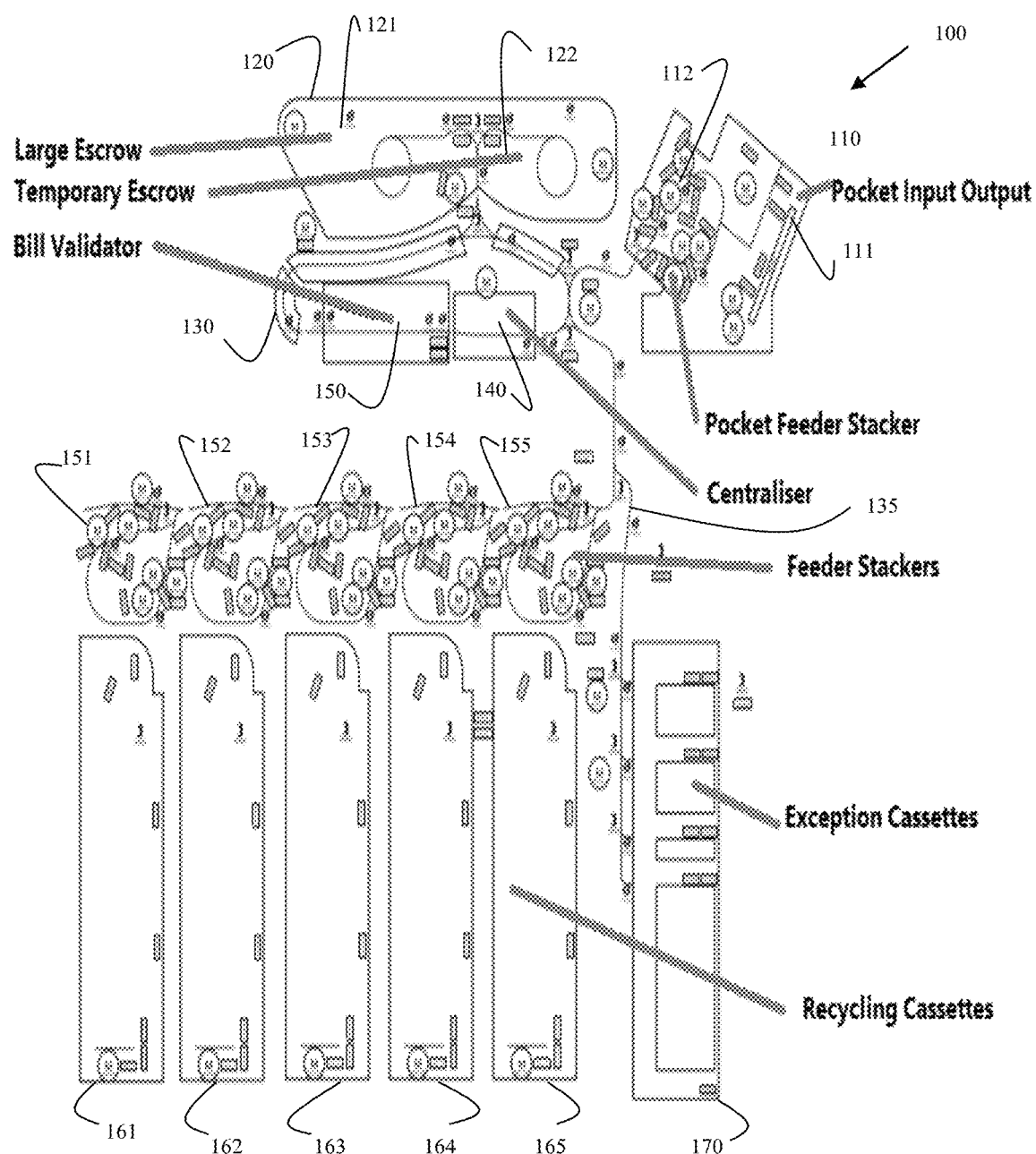
FIG. 1 is a system for a modular recycling device of a Self-Service Terminal, according to an example embodiment.

FIG. 1 is a system 100 for a modular recycling device of a Self-Service Terminal, according to an example embodiment. It is to be noted that the system 100 is shown with only those components relevant to understanding the various embodiments presented herein for a modular recycling device.

As used herein, the phrase "valuable media" refers to media of value, such as currency, coupons, checks, negotiable instruments, value tickets, and the like. As such, the phrases and terms "media," "valuable media," "document," "currency note," and "note," may be used synonymously and interchangeably herein.

For purposes of the discussions that follow with respect to the FIGS. 1-18, "valuable media" is referred to as "notes" and the "modular recycling device" is referred to as a "recycling device."

As used herein a "module" is an independent electromechanical device that may or may not have its own Printed Circuit Board (PCB) with software/firmware processing capabilities (through at least one hardware processor, memory, and non-volatile storage). Therefore, one module may have its own independent PCB, while another module may be controlled through a different module's PCB. Additionally, a "module" may be used synonymously and interchangeably with the terms "component," and "node."

As used herein, a "security processor" is a processor that is PCI-certified, includes: encryption engines; tamper pins and secure key storage; voltage, frequency, temperature monitors and a die active shield; on-the-fly encryption/decryption, and a secure boot procedure. The processor pins are protected by an encasing Printed Circuit Board (PCB) mesh. The PCB mesh is connected to the processor's tamper responsive circuit, such that when the mesh is broken, the encryption keys are erased.

Conventionally, components of an ATM (one type of Self-Service Terminal (SST)), are centrally controlled by a host Personal Computer (PC) through a core ATM application that processes on the host PC. Any integrated modules that are relevant to note deposit and note withdrawal transactions may have processing capabilities; however, the modules do not collaborate with one another; rather, collaboration, if done at all, is achieved through the processing of the core ATM application. This means that modules can be more easily compromised, bypassed, and/or swapped out by intruders with insecure modules or missing modules, creating security concerns for notes being deposited or withdrawn from the ATM.

Furthermore and conventionally, the feeder/stackers (f/s) of the lower transport module are integrated into the media (note) cassettes, which means any security relevant to the cassettes is entirely controlled by the cassettes and tightly coupled into the cassette. Such architecture also prevents scalability of the ATM with respect to the cassettes.

There are a number of scenarios that are of concern on ATMs in terms of security, such as malicious software that implements attacks to: fool a customer into making a deposit and return the deposit to a criminal (malware cash trap), and dispense cash from the recycler module to a criminal (malware cash dispense). For malware cash trap the commands that are vulnerable include: open shutter, close shutter, count, and store. For malware cash dispense the commands that are vulnerable include stack.

Other security concerns are present when deposit/dispense modules are bypassed or swapped out with malware infected or insecure modules that permit a thief to dispense notes from the cassettes.

The system 100 for a modular recycling device described herein corrects the lack of scalability and improves on the security holes of the deposit/dispense modules in a SST over conventional approaches. This is done by changing the conventional architecture and the conventional processing associated with processing a note during a deposit or during a withdrawal through novel module message passing that includes security processing.

As will be described more completely herein, the system 100 provides a modular and scalable architecture that collectively defines an infrastructure for distributed note handling (processing), where the modules (may also be referred to as "nodes" herein) collaborate over a secure device-level (SST composite device-level) Intranet. This provides distributed command, control, security, and data functions for deposit and withdrawal note processing within the SST.

The system 100 includes a pocket infeed module 110, an escrow module 120, an upper note transport module 130, a centralizer module 140, a note validator module 150, a lower note transport module 135, a plurality of f/s modules 151-155, a plurality of cassette modules 161-165, and a plurality of exception cassette modules 170.

The transport paths that a note can take during deposit and withdrawal operations on the SST are shown and described below with respect to the FIGS. 3-6.

The pocket infeed module 110 includes a pocket 111 for receiving (during a deposit operation/transaction) a single note or a bunch of notes (notes represented by the circles in the FIGS. with an "M" inside the circles). Unlike a conventional pocket infeed module, the pocket infeed module 111 also includes its own f/s 112. When a bunch of notes are placed in the pocket 111, the notes are transported to the f/s 112, which then delivers each note individually to the upper transport module 130 to the centralizer 140. The f/s 112 also stacks notes during a withdrawal transaction for delivery through the pocket 111 to a consumer performing the withdrawal transactions.

In an embodiment, the pocket infeed module 110 is capable of handling a deposit of approximately 300 notes as a bunch deposit maximum and is capable of dispensing approximately 300 notes as a bunch dispense maximum.

In an embodiment, the pocket infeed module 110 includes a metal and foreign object detector at the pocket 111 infeed to prevent damage to the system 100 when non-note objects are put into the pocket 111.

It is also to be noted that although, the pocket infeed module 110 has thus far been described as receiving notes for processing, the pocket infeed module 110 is also designed to eject notes during a withdrawal transaction or when a note is rejected and not stored in one of the exception cassettes 170.

The centralizer 140 ensures that each note being processed within the system 100 is centralized on the transport path independent of the dimensions of the notes. The centralizer 140 delivers each note in the bunch to the validator 150. The validator 150 performs note identification (note denomination, note type (government backing the note, check, etc.) on received notes, and the validator 150 performs note validation processing on received notes to determine whether the notes are damaged, counterfeit, and/or authentic. The validator 150 then passes the note to the escrow 120.

The escrow 120 includes a large escrow 121 for holding/storing authenticated/validated notes on a rotating drum. The escrow also includes a temporary escrow 122 for holding/storing damaged or counterfeit notes on a separate rotating drum. The escrow 120 provides each note to the upper transport 130. The upper transport 130 sends each note along the transport path to the lower transport 135.

Conventionally, at this point, the notes would be sent by a conventional lower transport to a conventional cassette. This is not the case with the system 100, where the lower transport 135 sends the notes to the f/s 151-155 and based on the denomination of the note being handled a particular f/s (e.g., 151) feeds or stacks the note(s) into a particular note denomination-based cassette (e.g., 161) for storage.

If the note provided by the escrow 120 to the upper transport 130 is received by the lower transport 135 as a damaged or counterfeit note, the lower transport 135 directs the note to one of the exception cassettes 170 where the note is housed/stored. The exception cassettes 170 are removable modules.

The processing described above illustrated a deposit transaction. The processing for a withdrawal transaction is reversed, where a particular cassette 161 or set of cassettes 161-165 (based on the needed denominations) delivers the notes to the corresponding f/s 151-155. The note then is sent to the lower transport 135 and provided to the upper transport 130 where it is provided to the f/s 112 of pocket infeed module 110 and sent from the f/s 112 to the pocket 111 for delivery through an aperture (opening) to a customer performing the withdrawal transaction.

The pocket infeed 110, the escrow 120, the upper transport 130, the validator 150, the lower transport 135, each of the f/s 151-155, the cassettes 161-165, and the exception cassettes 170 include their own PCB (with processor, memory, and storage). Conventionally, not all of these modules including their own independent processing capabilities or hardware; rather, the modules were controlled by the PCBs of other modules or exclusively by the host PC of the SST.

Each of the above noted modules (110, 120, 130, 150, 135, 151-155, 161-165, and 170) include at least one security processor. Firmware or software is programmed on each module to send and process messages during deposit and withdrawal transactions on the SST. The firmware performs cryptographic operations on received messages to authenticate the received message. Furthermore, each module includes secure memory or storage that allows for management by the firmware of cryptographic keys, certificates, hash values, etc. The firmware can process symmetric key management, symmetric data message authentication, asymmetric Public Key Infrastructure (PKI) authentication for symmetric key distribution, etc. Each module includes its own unique identifier (e.g., serial number, part number, revision and manufacture date and time stamp) that is utilized to provide each module with a unique cryptographic key/hash value. This provides a mechanism by which each module can uniquely authenticate and verify each of the remaining modules and determine the authenticity of any received message during the deposit or withdrawal operations on the SST. Each module can also generate its own messages with its own digital signature or modify an existing message that was processed by a previous module and is being sent by a particular module to a next module.

As used further herein, the modules 110, 120, 130, 150, 135, 151-155, 161-165, and 170 are collectively referred to as the modular recycling device.

Each module of the modular recycling device processes commands, control operations, and data operations. Moreover, each module of the modular recycling device is configured to perform self-diagnostic tests on itself and perform fault management operations. Each module of the modular recycling device is configured to cryptographically create messages, modify existing messages, and validate/authenticate received messages from other ones of the modules that comprise the modular recycling device. The modules of the modular recycling device provide distributed, collaborative, cooperative, and security-based operations during transactions at the SST where notes are being deposited into or withdrawn from the cassettes 161-165.

Figure 2:
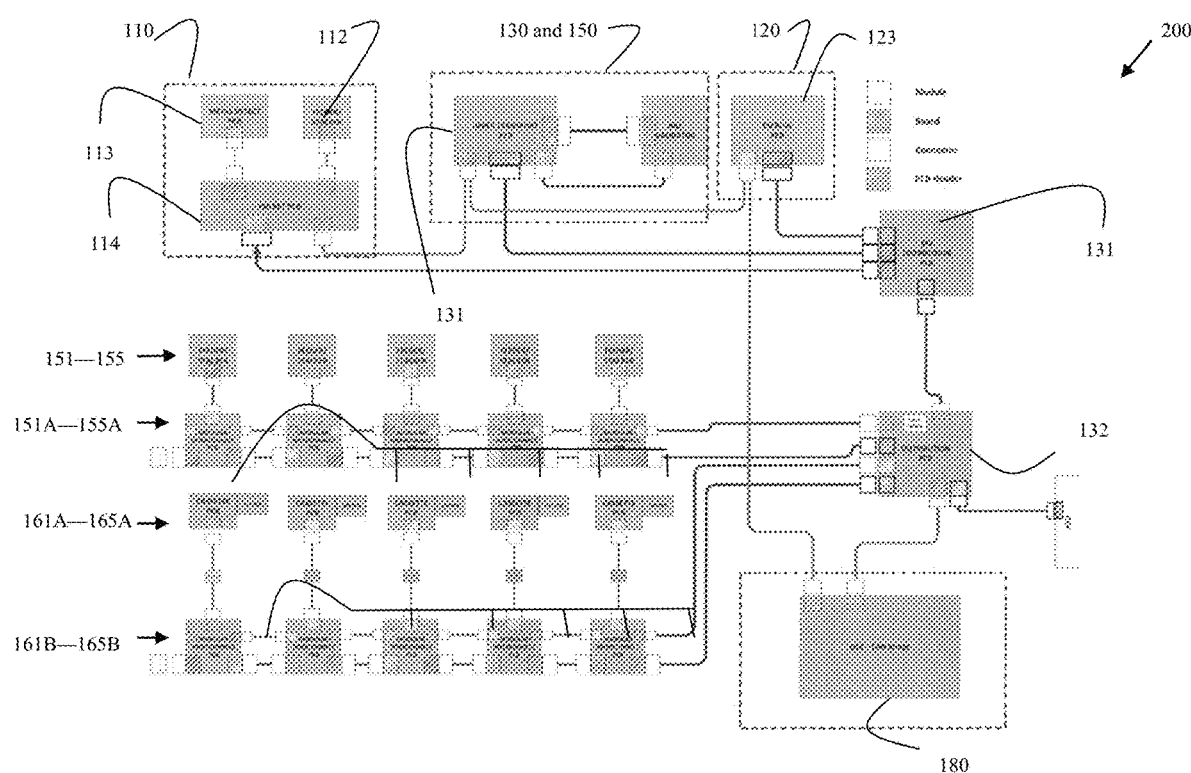
FIG. 2 is a diagram of layout for Printed Circuit Boards (PCBs) of components of the modular recycling device, according to an example embodiment.

FIG. 2 is a diagram of an architectural layout for Printed Circuit Boards (PCBs) of components of the modular recycling device, according to an example embodiment.

It is to be noted that other arrangements with more or less PCBs may be used without departing from the modular recycling device embodiments presented herein. That is, the FIG. 2 represent one example architectural layout and connection pattern of PCBs for the modules that comprise the modular recycling device.

The pocket infeed 110 includes a pocket PCB 114, a metal detector PCB 113, and the feeder stacker 112. The upper transport 130 and the bill validator 150 include an upper transport PCB 131. The escrow 120 includes an escrow PCB 123. A distribution PCB 131 interfaces/connects the PCBs of the pocket infeed 110, the upper transport 130, the validator 150, and the escrow 120.

A second distribution PCB 132 interfaces the upper distribution PCB 131 to the modules of the lower transport 135. Each f/s (151-155) includes its own modular interconnect PCB (151A-155A). Each cassette (161-165) includes a cassette PCB and a lift PCB 161A-165A. Each cassette PCB 161A-165A is connected to a modular interconnect PCB 161B-165B. A USB CAN bridge provides connections from the lower distribution PCB 132 to the escrow PCB 123.

Figure 3:
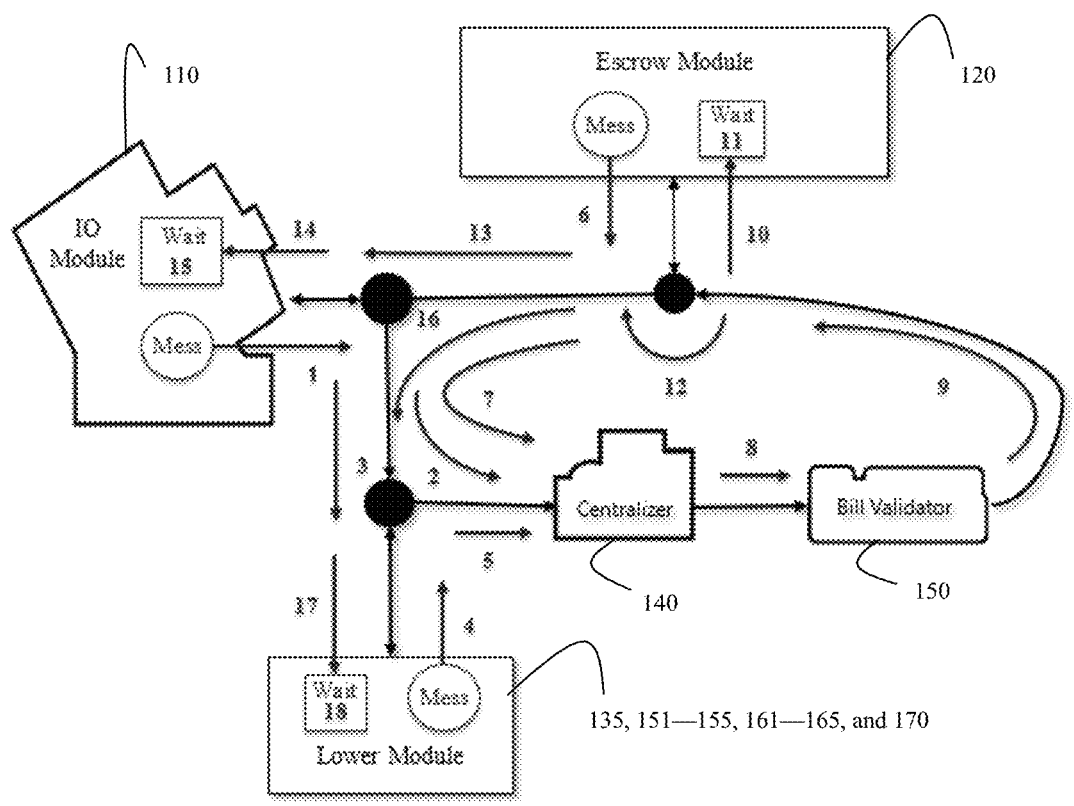
FIG. 3 is a diagram of the processing and transport paths of valuable media within the module recycling device, according to an example embodiment.

FIG. 3 is a diagram of the processing and transport paths of valuable media within the module recycling device, according to an example embodiment.

The FIG. 3 depicts the possible paths for a note through the modular recycling device during a deposit or a withdrawal transaction at the SST. Again, this is achieved through message (identified as "Mess") in the FIGS. 3-6 and the PCBs of the modules that comprise the modular recycling device.

Specifically, FIG. 3 depicts the possible note paths and messages for processing the notes with the upper transport 130 to or from the lower transport 135. The lower module is intended to include the modules 135, 151-155, 161-165, and 170.

The path of the note begins at (1) within the pocket infeed 110. The first Mess identifies whether the transaction at the SST is a deposit or a withdrawal. Assuming, the transaction is a deposit, the note is passed along the transport path (2) to the centralizer 140 where the note is centralized (centered) along the transport track. If the Mess was a withdrawal transaction, then the Mess (3) is sent from the packet infeed 110 to the lower module (135, 151-155, 161-165, and/or 170). The note received (4) for a withdrawal from the lower module (135, 151-155, 161-165, and/or 170) or a note being deposited is received by the centralizer 140 (2 or 5) and centered along the transport path. Next, the escrow module 120 sends a message to receive the note (6 and 7) from the centralizer 140. The centralizer 140 provides the note (8) to the bill validator 150. The bill validator 150 validates or invalidates the note and sends the note (9) where it is received (10) by the escrow 120. The escrow 120 then waits until all notes in a bunch being deposited are received (11) more notes are received at (12). The escrow provides notes associated with rejected notes, at (13), to the f/s 111 of the pocket infeed 100, the f/s 111 receives the rejected notes at (14) and waits (15) until all notes in a bunch associated with a rejected notes are received from the escrow 120. The f/s 111 provides notes from a bunch being deposited at 16. The lower module (135, 151-155, 161-165, and/or 170) receives notes being deposited at 17 and waits at 18 until all notes are received by the lower module (135, 151-155, 161-165, and/or 170).

Figure 4:
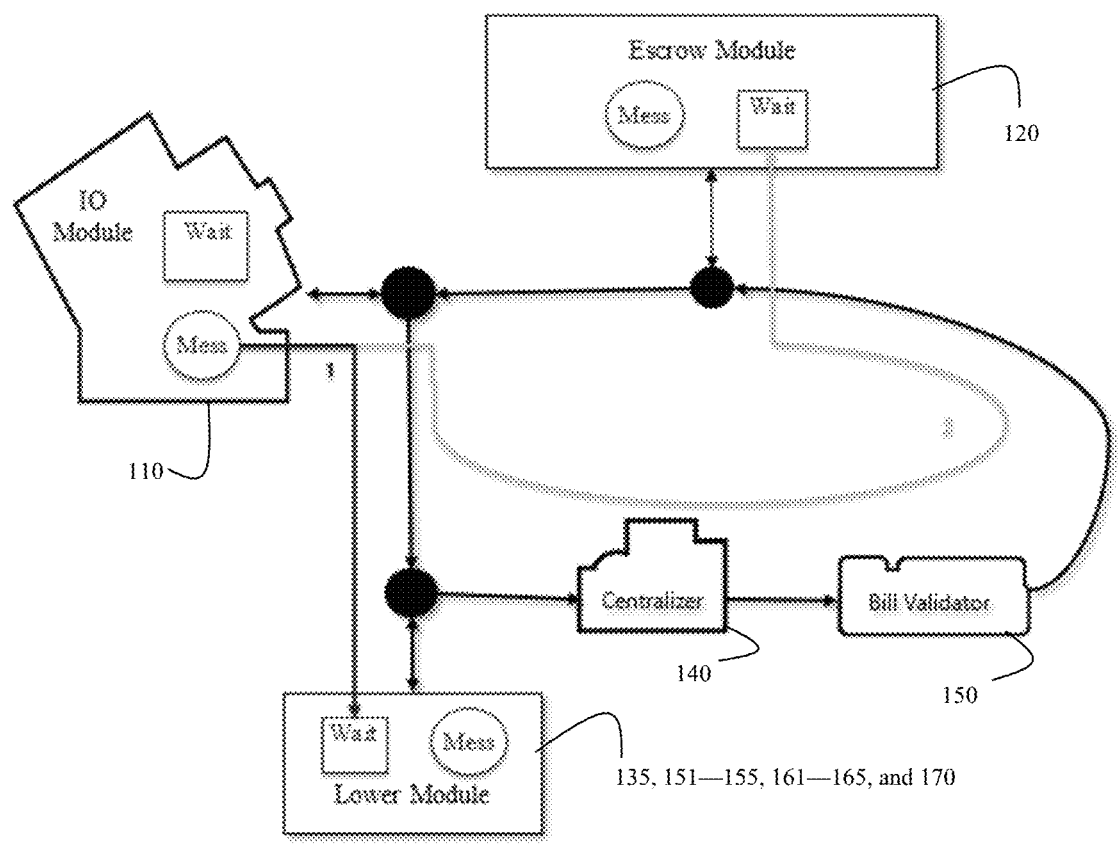
FIG. 4 is a diagram of the processing and transport paths of valuable media being deposited into the modular recycling device, according to an example embodiment.

FIG. 4 is a diagram of the processing and transport paths of valuable media being deposited into the modular recycling device, according to an example embodiment.

Specifically, FIG. 4 illustrates the note paths and messages for the upper transport 130 that are provided to the lower modules (135, 151-155, 161-165, and/or 170) for storage in the appropriate cassettes 161-165.

At 1 a message is sent that a deposit for a bunch of notes is being made on the SST to the lower module (135, 151-155, 161-165, and/or 170). The notes are individually sent from the bunch maintained by the f/s 111 to the centralizer 140. The centralizer 140 provides each note from the bunch to the bill validator 150. The bill validator 150 provides to each note from the bunch to the escrow 120. At 2, the pocket infeed 110 sends a message when the last note of the bunch is processed through the f/s 111 to the escrow 120. The escrow 120 waits until receiving message 2 to process the notes from the bunch. It may be that one or more invalidated notes are sent back from the escrow 120 to the f/s 111 for ejection out the pocket infeed 110 based on validation information received from the validator 150 while the notes were processed.

The note path associated with deposits to the escrow 120 can be seen in path 1-2-8-9-10-11 in the FIG. 3. While note path associated deposits to the lower module (135, 151-155, 161-165, and/or 170) can be seen in path 1-3-17-18 in the FIG. 3.

Figure 5:
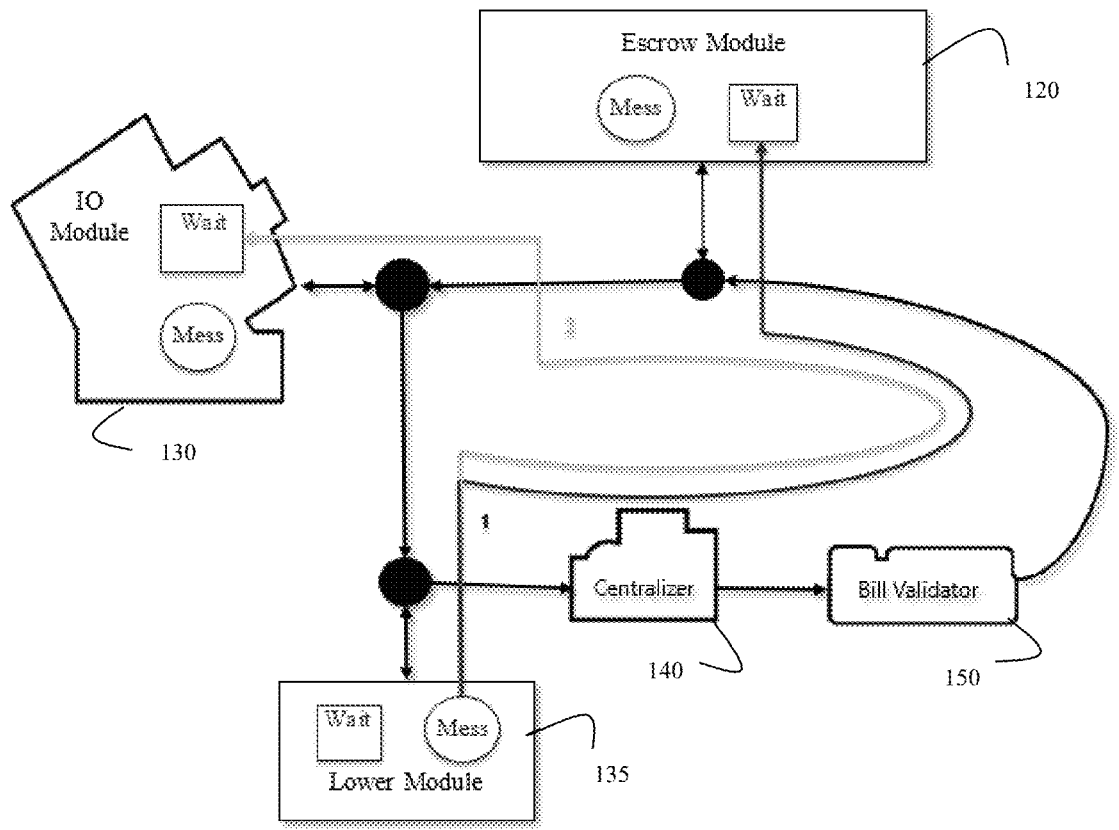
FIG. 5 is a diagram of the processing and transport paths of valuable media being dispensed from the module recycling device, according to an example embodiment.

FIG. 5 is a diagram of the processing and transport paths of valuable media being dispensed from the module recycling device, according to an example embodiment.

Specifically, the note paths and messages associated with dispensing a bunch of notes or a single note from the lower module (135, 151-155, 161-165, and/or 170) back to the pocket infeed 110 for delivery to a consumer during a withdrawal transaction at the SST are depicted in the FIG. 5.

A message is sent at 1 to the escrow 120 at 1 to wait until the all notes being dispensed are sent by the lower module (135, 151-155, 161-165, and/or 170) to the escrow module, and the pocket infeed 110 is instructed to wait at 2 for notes of the bunch being dispensed by the lower module (135, 151-155, 161-165, and/or 170).

The note path for dispensing from the lower module (135, 151-155, 161-165, and/or 170) to the escrow 120 is shown in the FIG. 3 as note path 4-5-8-9-10-11. While the note path to dispense to the pocket infeed 110 is shown in the FIG. 3 as note path 4-5-8-9-12-13-14-15.

Figure 6:
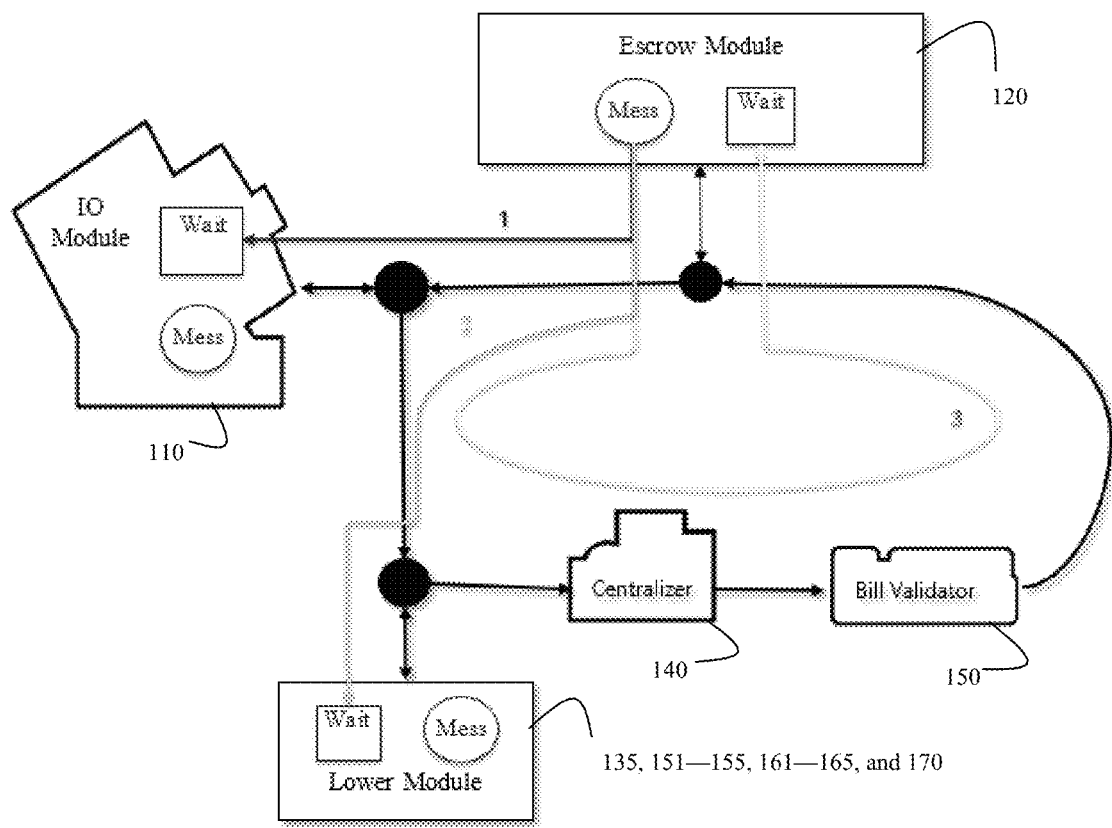
FIG. 6 is a diagram of the processing and transport paths of valuable media for transaction agnostic operations within the modular recycling device, according to an example embodiment.

FIG. 6 is a diagram of the processing and transport paths of valuable media for transaction agnostic operations within the modular recycling device, according to an example embodiment.

Specifically, the FIG. 6 depicts the note paths and messages during dispense and deposit operations.

A message is sent at 1 to the pocket infeed at 1 to wait until the notes being dispensed are acquired and the lower module (135, 151-155, 161-165, and/or 170) is instructed to wait at 2. The escrow module 120 waits at 3 until all notes are received to satisfy the withdrawal transaction.

The note path associated with dispensing from the escrow 120 is shown in the FIG. 3 as note path 6-13-14-15. The note path associated with depositing from the escrow 120 is shown in the FIG. 3 as note path 6-16-17-18. The note path associated with escrow to escrow operations is shown as note path 6-7-8-9-10-11 in the FIG. 3.

Figure 7:
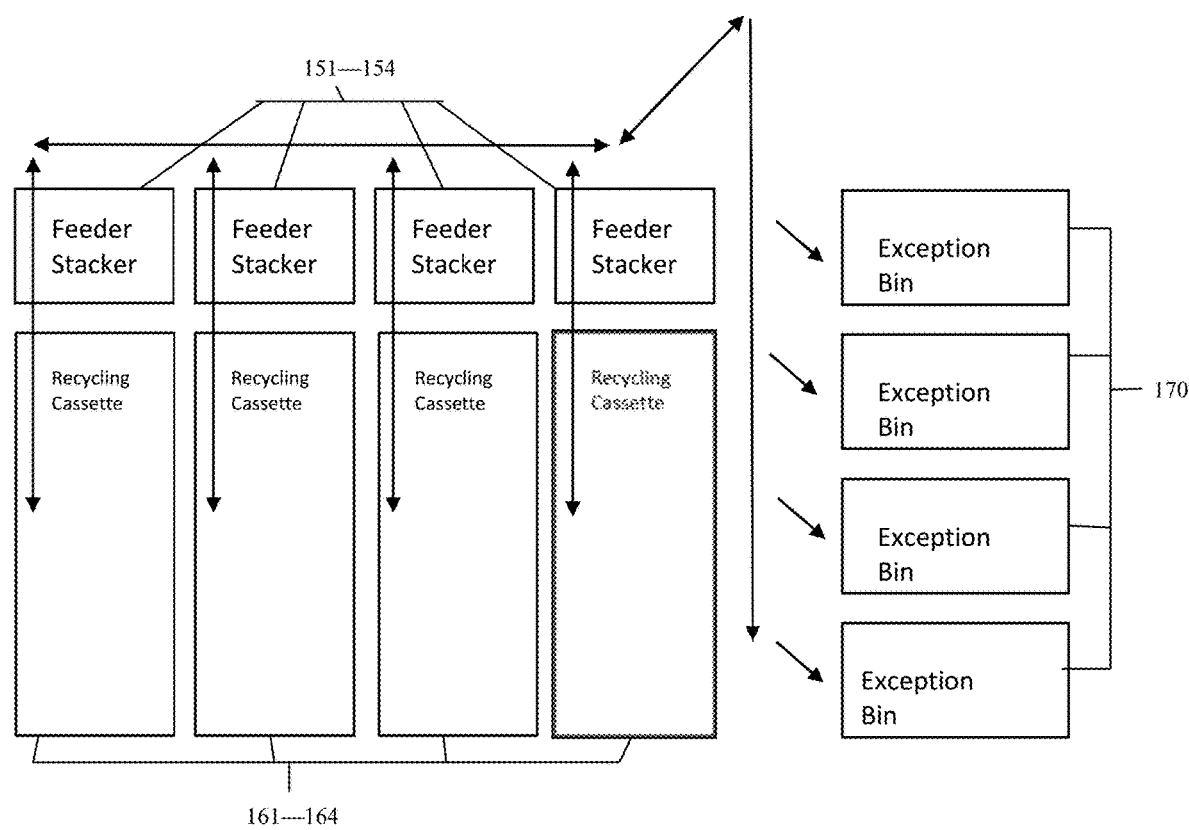
FIG. 7 is a diagram of the processing and transport paths of valuable media into and out of the media cassettes of the modular recycling device, according to an example embodiment.

FIG. 7 is a diagram of the processing and transport paths of valuable media into and out of the media cassettes of the modular recycling device, according to an example embodiment.

Specifically, the shows the note paths and messaging for notes being received into or dispensed from the cassettes 161-164 and/or the exception cassettes 170 utilizing the modular f/s 151-154. The f/s 151-154 are decoupled from the cassettes 161-164. Conventionally, the f/s are integrated into the cassettes. The arrows depict the note paths into and from the cassettes 161-164 and/or the exception cassettes 170 within the lower transport 135 as received from or being provided to the upper transport 130.

Figure 8:
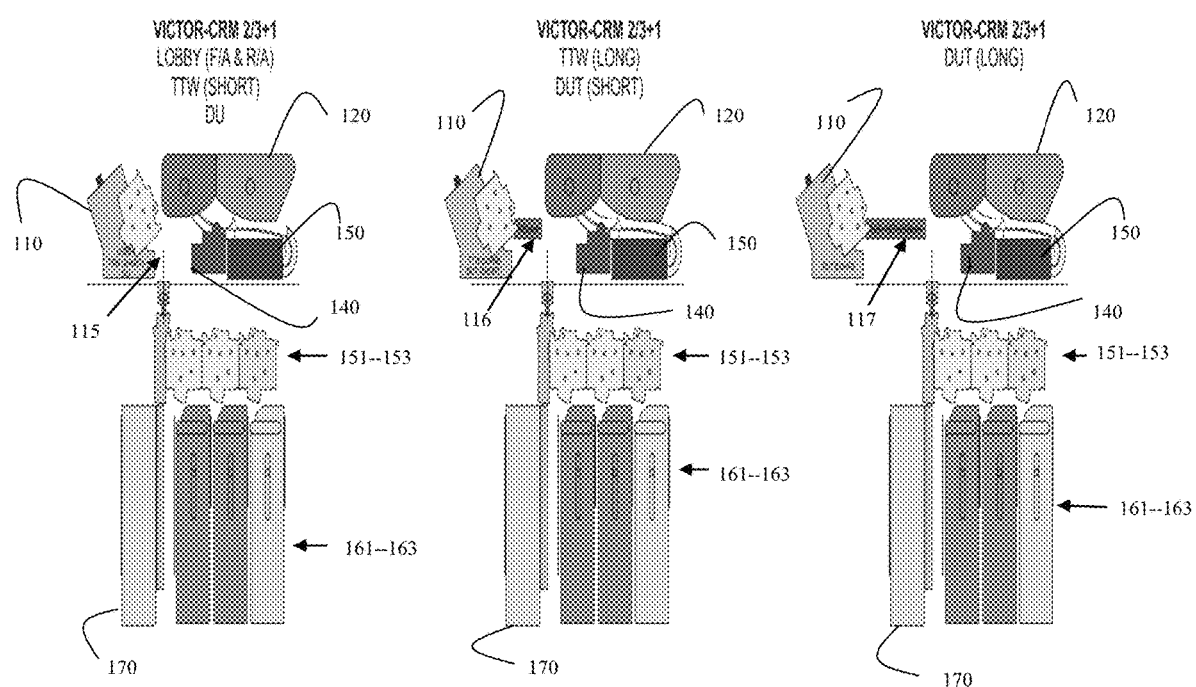
FIGS. 8-10 are diagrams depicting configurations and modules of the modular recycling device to accommodate different lengths of a transport path in desired configurations of a SST, according to example embodiments.
Figure 9:
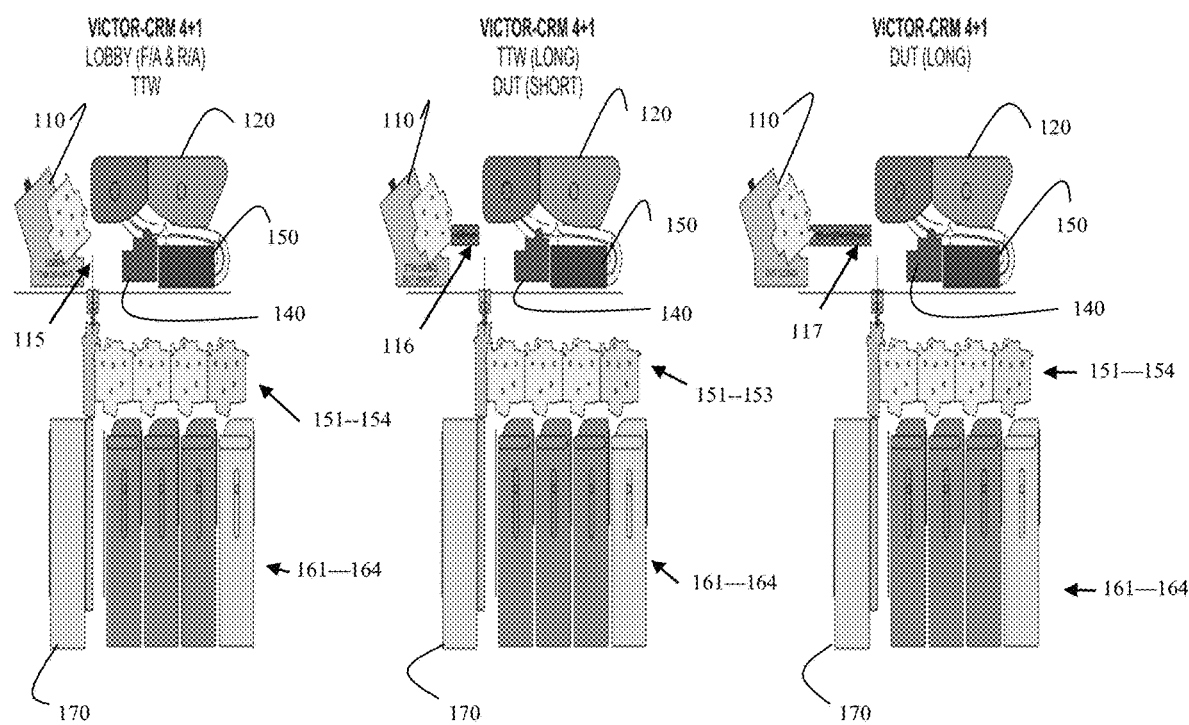
Figure 10:
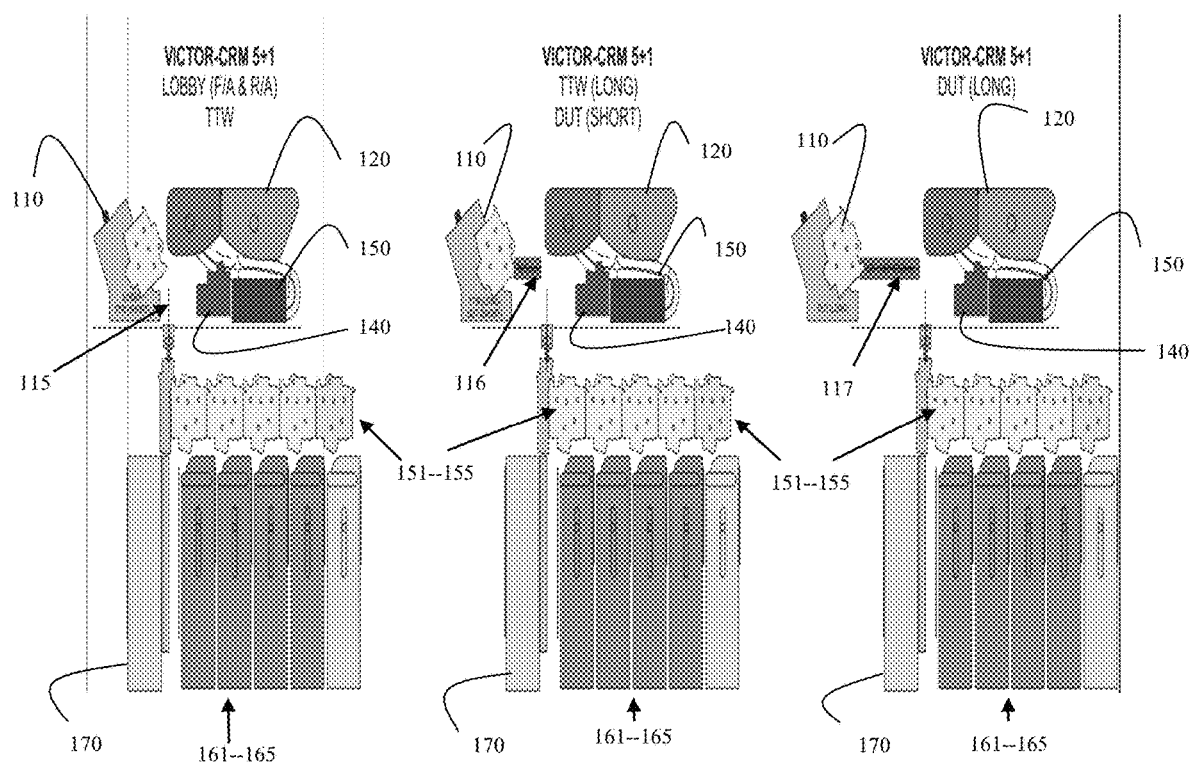

FIGS. 8-10 are diagrams depicting configurations and modules of the modular recycling device to accommodate different lengths of a transport path in desired configurations of a SST, according to example embodiments.

Specifically, the FIGS. 8-10 illustrate how a desired number of feeders 151-155 and cassettes 161-165 can be configured within a modular recycling device of a SST. The length and width of the transport track between the pocket infeed 110 with respect to both the lower transport 135 and the upper transport 130 can be short (shown with the arrow 115). The width of the track can be long while the length is short (shown with the arrow 116). Moreover, the width of the track and the length of the track can both be long (shown with the arrow 117). This scalability is shown in each of the FIGS. 8, 9, and 10.

Additionally, the number of cassettes 161-165 can be varied as illustrated with 3 (161-163) in the FIG. 8, 4 (161-164) in the FIGS. 9, and 5 (161-165) in the FIG. 10.

One f/s (one of 151-155) handles externally feeding a note or stacking a note in a corresponding one of the cassettes (one of 161-165).

This modular architecture provides scalability and customization for different SSTs, cassette configurations, and servicing access (through rear of front service access panels).

In an embodiment, the modular recycling device (135, 151-155, 161-165, and/or 170) is integrated into a SST. In an embodiment, the SST is an ATM. In an embodiment, the SST is operated in customer-assistance mode by a clerk as a Point-Of-Sale (POS) terminal. In an embodiment, the SST is a kiosk.

These and other embodiments are now discussed with reference to the FIGS. 11-18.

Figure 11:
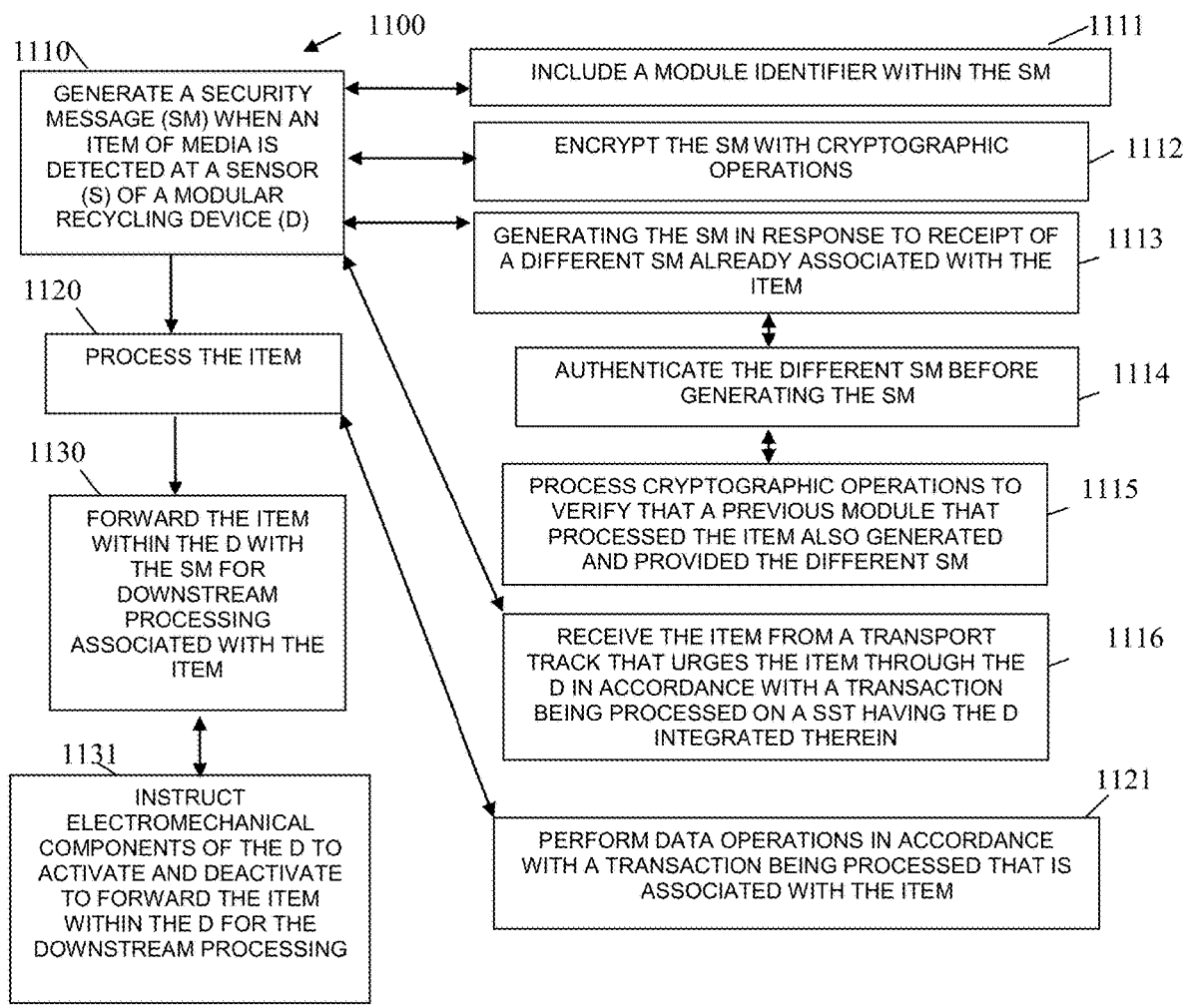
FIG. 11 is a diagram of a method for operating the modular recycling device, according to an example embodiment.

FIG. 11 is diagram of a method 1100 for operating the modular recycling device, according to an example embodiment. The method 1100 is processed on at least one processor of a modular recycling device.

In an embodiment, the modular recycling device is modules 110, 120, 130, 150, 135, 151-155, 161-165, and 170. In an embodiment, the modular recycling device is integrated into a SST. In an embodiment, the SST is an ATM. In an embodiment, the SST is operated in a customer-assistance mode of operation by a clerk as a POS terminal.

In an embodiment, the method 1100 is performs the media item (note) processing within the modular recycling device as one of the modules 110, 120, 130, 150, 135, 151-155, 161-165, and 170.

In an embodiment, the method 1100 performs the message and note processing described above with the FIGS. 1-10.

At 1110, the method 1100 generates a security message when an item of media (valuable media, note, and/or bill) is detected at a sensor of the modular recycling device.

In an embodiment, at 1111, the method 1100 includes a module identifier within the security message. The module identifier identifies the module (one of 110, 120, 130, 150, 135, 151-155, 161-165, and 170) this is handling/processing the media item.

In an embodiment, at 1112, the method 1100 encrypts the security message with cryptographic operations.

In an embodiment, at 1113, the method 1100 generates the security message in response to receiving a different security message that was already associated with the media item.

In an embodiment of 1113 and at 1114, the method 1100 authenticates/validates the different security message before generating the security message.

In an embodiment of 1114 and at 1115, the method 1100 processes cryptographic operations to verify that a previous module that processed the media item also generated and provided the different security message with the media item.

In an embodiment, at 1116, the method 1100 receives the media item from a transport track that urges the media item through the modular recycling device in accordance with a transaction being processed on a SST having the modular recycling device integrated therein. In an embodiment, the transaction is a deposit transaction at the SST. In an embodiment, the transaction is a dispense transaction at the SST.

At 1120, the method 1100 processes/handles the media item the media item. This depends on the module (110, 120, 130, 150, 135, 151-155, 161-165, and 170) associated with the method 1100 as discussed above with the FIGS. 1-10.

At 1130, the method 1100 forwards the media item within the modular recycling device with the security message for downstream processing associated with the media item.

In an embodiment, at 1131, the method 1100 instructs electromechanical components of the modular recycling device to activate and deactivate to forward the media item within the modular recycling device for the downstream processing on the media item.

Figure 12:
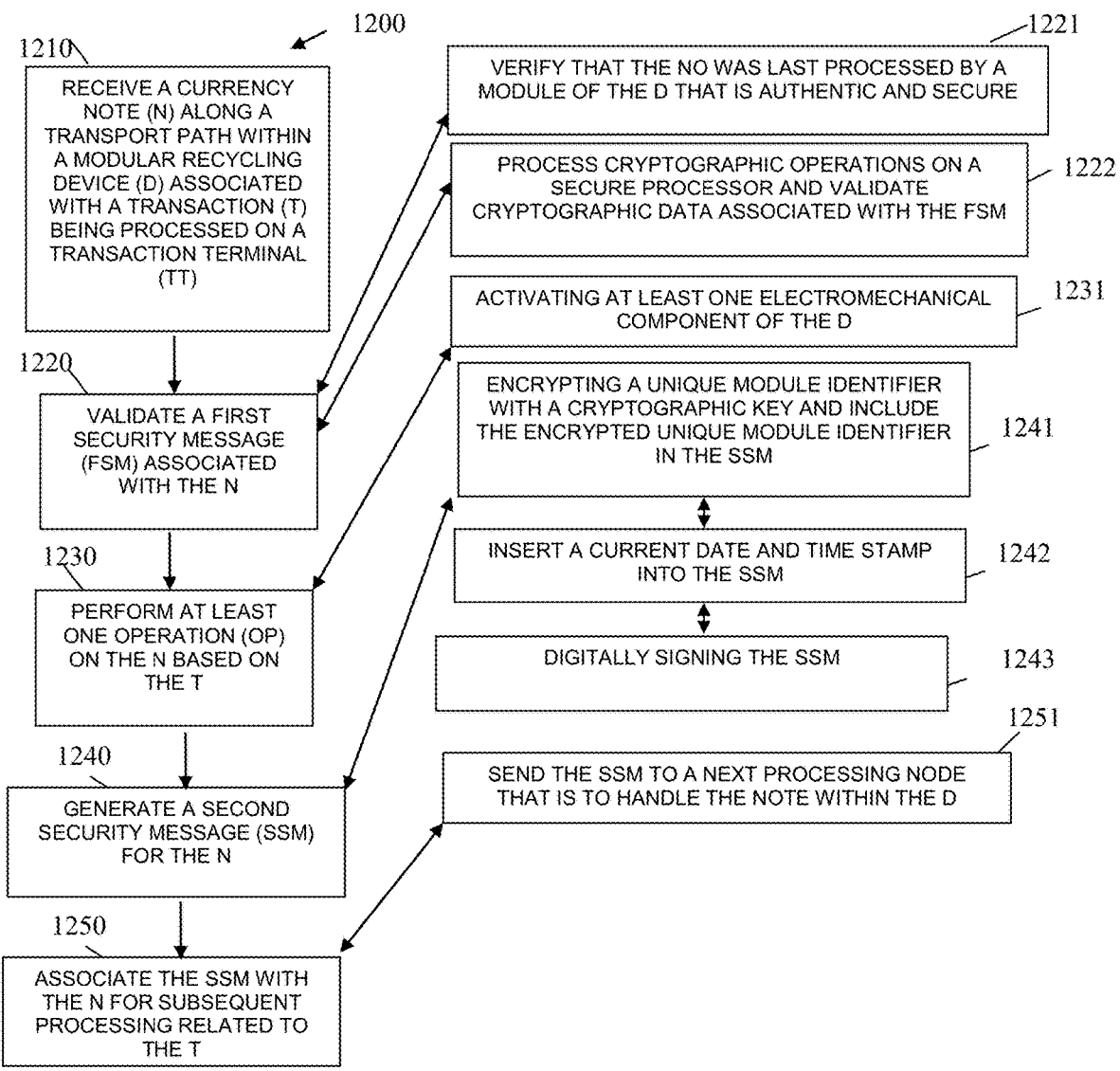
FIG. 12 is a diagram of another method for operating the modular recycling device, according to an example embodiment.

FIG. 12 is a diagram of another method 1200 for operating the modular recycling device, according to an example embodiment. The method 1200 is processed on at least one processor of a modular recycling device.

In an embodiment, the modular recycling device is the modules 110, 120, 130, 150, 135, 151-155, 161-165, and 170. In an embodiment, the modular recycling device is integrated into a SST. In an embodiment, the SST is an ATM. In an embodiment, the SST is operated in a customer-assistance mode of operation by a clerk as a POS terminal.

In an embodiment, the method 1200 performs the message and note processing described above with the FIGS. 1-10 as one of the modules/nodes 110, 120, 130, 150, 135, 151-155, 161-165, and 170.

At 1210, the method 1200 receives a note along a transport path within a modular recycling device associated with a transaction that is being processed on a transaction terminal. In an embodiment, the transaction terminal is a SST. In an embodiment, the SST is an ATM. In an embodiment, the SST is kiosk. In an embodiment, the transaction terminal is a POS terminal.

At 1220, the method 1200 validates a first security message associated with the note.

In an embodiment, at 1221, the method 1200 processes cryptographic operations on a secure processor and validates cryptographic data associated with the first secure message.

At 1230, the method 1200 performs at least one operation on the note based on the transaction.

In an embodiment, at 1231, the method 1200 activates at least one electromechanical component of the modular recycling device to perform the at least one operation. In an embodiment, the at least one electromechanical component is one or more of: a drum, a feeder, a stacker, a transport path, an imaging device, and a shutter door.

At 1240, the method generates a second security message for the note.

In an embodiment, at 1241, the method 1200 encrypts a unique module identifier with a cryptographic key and includes the encrypted unique module identifier in the second security message. In an embodiment, the module identifier is associated with the module (one of 110, 120, 130, 150, 135, 151-155, 161-165, and 170) that is processing the method on its PCB, and the key is housed in secure memory of that module accessible to just the module.

In an embodiment of 1241 and at 1242, the method 1200 inserts a current data and time stamp into the secure security message.

In an embodiment of 1242 and at 1243, the method 1200 digitally signs the second security message.

At 1250, the method 1200 associates the second security message with the note for subsequent processing related to the transaction.

In an embodiment, at 1251, the method 1200 sends the second security message to a next processing node (one of 110, 120, 130, 150, 135, 151-155, 161-165, and 170) that is to handle/process the note within the modular recycling device.

Figure 13:
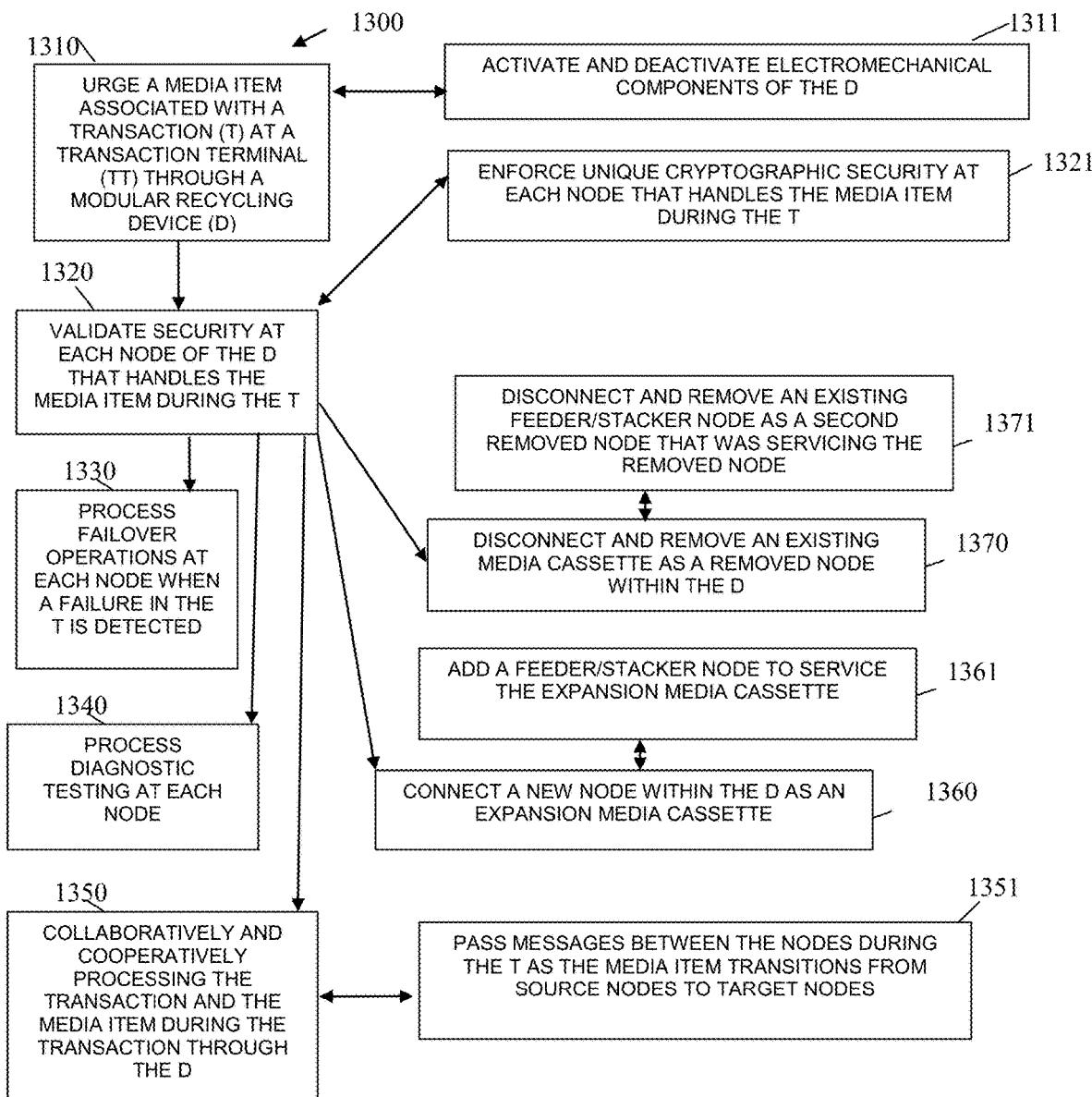
FIG. 13 is a diagram of still another method for operating the module recycling device, according to an example embodiment.

FIG. 13 is a diagram of still another method 1300 for operating the module recycling device, according to an example embodiment. The method 1300 is processed on at least one processor of a modular recycling device.

In an embodiment, the modular recycling device is the modules 110, 120, 130, 150, 135, 151-155, 161-165, and 170. In an embodiment, the modular recycling device is integrated into a SST. In an embodiment, the SST is an ATM. In an embodiment, the SST is operated in a customer-assistance mode of operation by a clerk as a POS terminal.

In an embodiment, the method 1300 performs the message and note processing described above with the FIGS. 1-10.

At 1310, the method 1300 urges a media item associated with a transaction at a transaction terminal through the modular recycling device.

In an embodiment, at 1311, the method 1300 selectively activates and deactivates electromechanical components of the modular recycling device.

At 1320, the method 1300 validates security at each node of the modular recycling device that handles the media item during the transaction.

In an embodiment, at 1321, the method 1300 enforces unique cryptographic security at each node that handles the media item during the transaction.

In an embodiment, at 1330, the method 1300 processes failover operations at each node when a failure in the transaction is detected.

In an embodiment, at 1340, the method 1300 processes diagnostic testing at each node.

In an embodiment, at 1350, the method 1300 collaboratively and cooperatively processes the transaction and the media item during the transaction through the modular recycling device.

In an embodiment of 1350 and at 1351, the method 1300 passes messages between the nodes during the transaction as the media item transitions from source nodes to target nodes.

In an embodiment, at 1360, the method 1300 connects a new node within the modular recycling device as an expansion media cassette.

In an embodiment of 1360 and at 1361, the method 1300 adds a feeder/stacker node to service the expansion media cassette.

In an embodiment, at 1370, the method 1300 disconnects and removes an existing media cassette as a removed node within the modular recycling device.

In an embodiment of 1370 and at 1372, the method 1300 disconnects and removes an existing feeder/stacker nodes as a removed node that was servicing the removed node.

Figure 14:
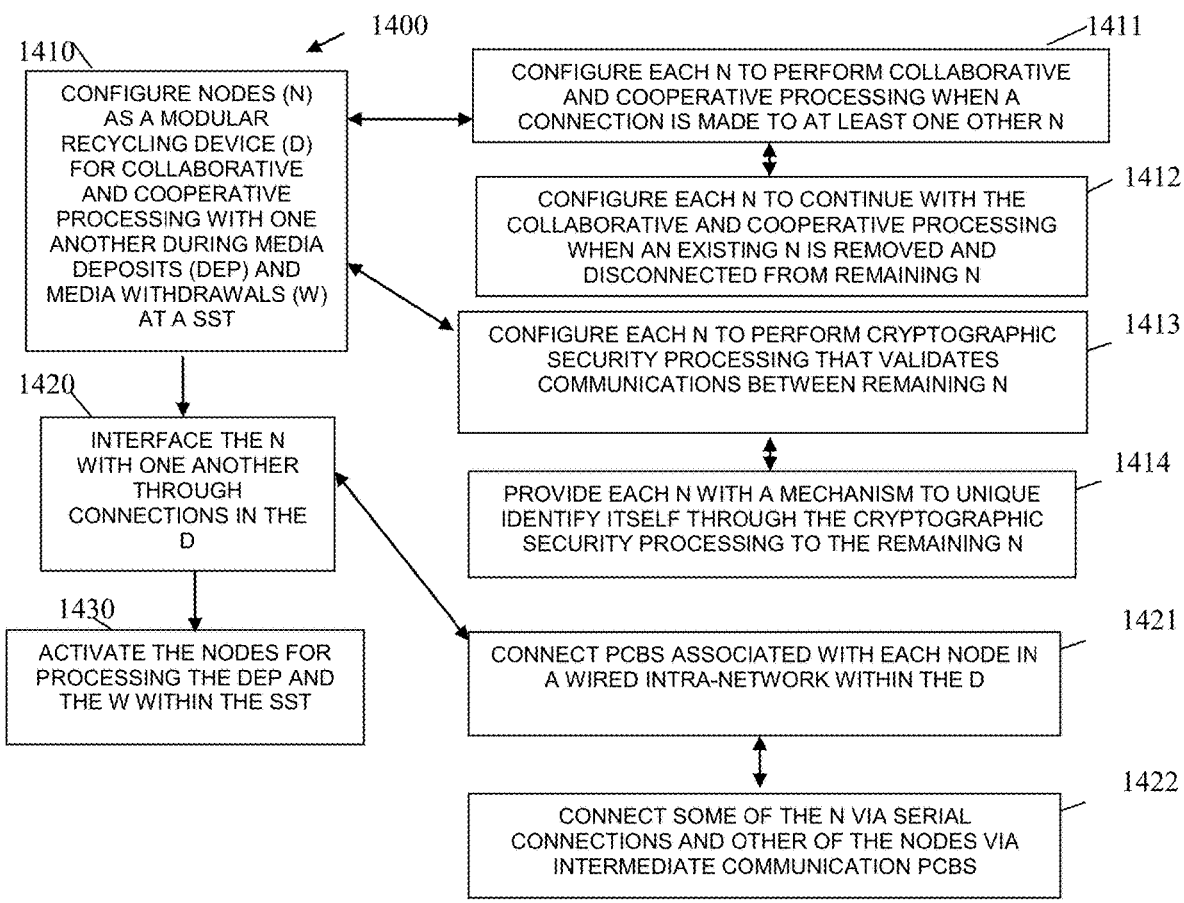
FIG. 14 is a diagram of yet another method for operating the modular recycling device, according to an example embodiment.

FIG. 14 is a diagram of yet another method 1400 for operating the modular recycling device, according to an example embodiment. The method 1400 is processed on at least one processor of a modular recycling device.

In an embodiment, the modular recycling device is the modules 110, 120, 130, 150, 135, 151-155, 161-165, and 170. In an embodiment, the modular recycling device is integrated into a SST. In an embodiment, the SST is an ATM. In an embodiment, the SST is operated in a customer-assistance mode of operation by a clerk as a POS terminal.

In an embodiment, the method 1400 performs the message and note processing described above with the FIGS. 1-10.

At 1410, the method 1400 configures a plurality of nodes (110, 120, 130, 150, 135, 151-155, 161-165, and 170) as a modular recycling device for collaborative and cooperative processing with one another during media deposits and media withdrawals at a SST.

In an embodiment, at 1411, the method 1400 configures each node to perform collaborative and cooperative processing when a connection is made to at least one other node.

In an embodiment of 1411 at 1412, the method 1400 configures each node to continue with the collaborative and cooperative processing when an existing node is removed and disconnected from remaining nodes.

In an embodiment, at 1413, the method 1400 configures each node to perform cryptographic security processing that validates communications between remaining nodes.

In an embodiment of 1413 and at 1414, the method 1400 provides each node with a mechanism to uniquely identify itself through the cryptographic security processing to the remaining nodes.

At 1420, the method 1400 interfaces the nodes with one another through connections in the modular recycling device.

In an embodiment, at 1421, the method 1400 connects PCBs associated with each node in a wired intra-network within the modular recycling device.

In an embodiment of 1421 and at 1422, the method 1400 connects some of the nodes via serial connections and other of the nodes via intermediate communication PCBs.

At 1430, the method 1400 activates the nodes for processing the media deposits and the media withdrawals within the SST.

Figure 15:
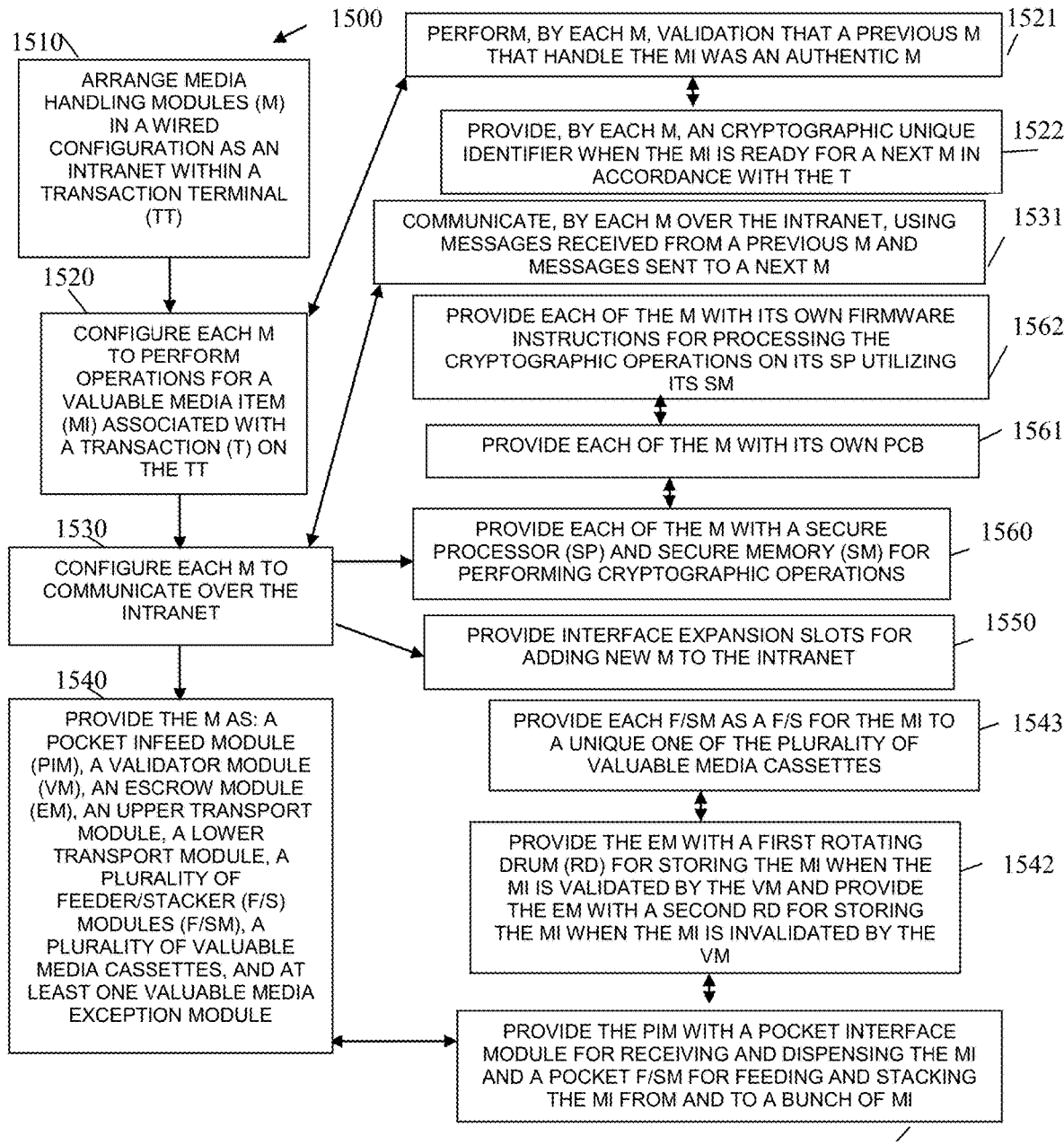
FIG. 15 is a diagram of another method for operating the modular recycling device, according to an example embodiment.

FIG. 15 is a diagram of another method 1500 for operating the modular recycling device, according to an example embodiment. The method 1500 is processed on at least one processor of a modular recycling device.

In an embodiment, the modular recycling device is the modules 110, 120, 130, 150, 135, 151-155, 161-165, and 170. In an embodiment, the modular recycling device is integrated into a SST. In an embodiment, the SST is an ATM. In an embodiment, the SST is operated in a customer-assistance mode of operation by a clerk as a POS terminal.

In an embodiment, the method 1500 performs the message and note processing described above with the FIGS. 1-10.

At 1510, the method 1500 arranges media handling modules (110, 120, 130, 150, 135, 151-155, 161-165, and 170) in a wired configuration as an intranet within a transaction terminal.

At 1520, the method 1500 configures each media handling module to perform operations for a valuable media item associated with a transaction being processed on the transaction terminal.

In an embodiment, at 1521, the method 1500 performs, by each media handling module, validation to ensure that a previous media handling module, which handled the valuable media item was an authenticate media handling module.

In an embodiment of 1521 and at 1522, the method 1500 provides, by each media handling module, a cryptographic unique identifier when the valuable media item is ready for a next media handling module in accordance with the transaction.

At 1530, the method 1500 configures each media handling module to communication with one another over the intranet (a networked contained within the transaction terminal or the media handling modules).

In an embodiment, at 1531, the method 1500 communicates, by each media handling module over the intranet, using messages received from a previous media handling module and messages sent to a next media handling module.

According to an embodiment, at 1540, the method 1500 provides the media handling modules as: a pocket infeed module 110, a validator module 150, and escrow module 120, an upper transport module 130, a lower transport module 135, a plurality of feeder/stacker modules 151-155, a plurality of valuable media cassettes 161-165, and at least one valuable media exception cassette module 170.

In an embodiment of 1540 and at 1541, the method 1500 provides the pocket infeed module 110 with a pocket interface module 111 for receiving and dispensing the valuable media and provides the pocket infeed module 110 with a pocket feeder/stacker module 112 for feeding and stacking the valuable media item from and to a bunch (stack) of valuable media items.

In an embodiment of 1541 and at 1542, the method 1500 provides the escrow module 120 with a first rotating drum 121 for storing the valuable media item when the valuable media item is validated by the validator module 150. The method 1500 also provides the escrow module 120 with a second rotating drum 122 for storing the valuable media item when the valuable media item is invalidated by the validator module 150.

In an embodiment of 1542 and at 1542, the method 1500 provides each of the feeder/stacker modules 151-155 to a unique one of the plurality of valuable media cassettes 161-165.

In an embodiment, at 1550, the method 1500 provides interface expansion slots for adding new media handling modules to the intranet.

In an embodiment, at 1560, the method 1500 provides each of the media handling modules with a secure processor and secure memory for performing cryptographic operations.

In an embodiment of 1560 and at 1561, the method 1500 provides each of the media handling modules with its own PCB.

In an embodiment of 1561 and at 1562, the method 1500 provides each of the media handling modules with its own firmware instructions for processing the cryptographic operations on its secure processor utilizing its secure memory.

Figure 16:
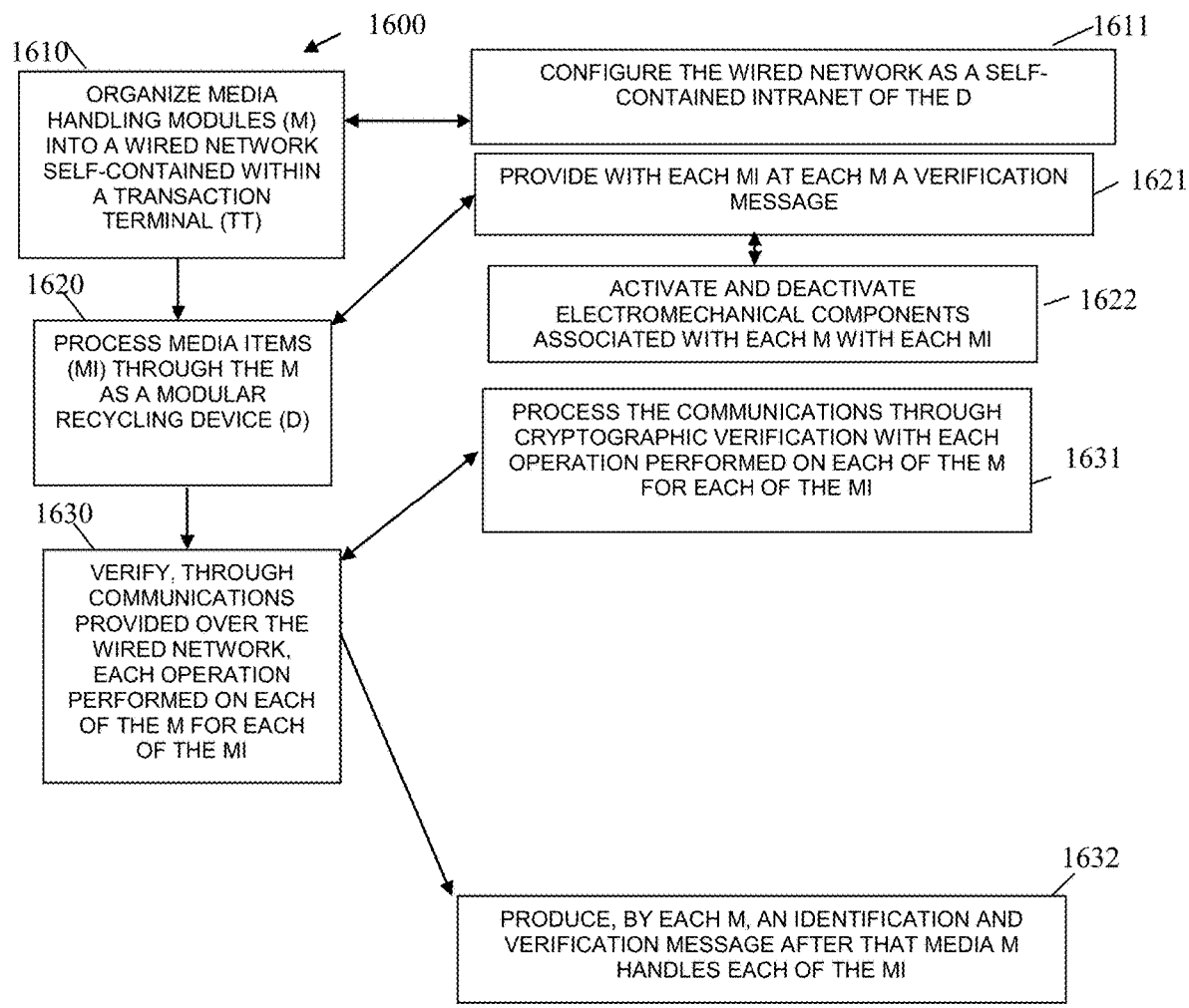
FIG. 16 is a diagram of another method for operating the modular recycling device, according to an example embodiment.

FIG. 16 is a diagram of another method 1600 for operating the modular recycling device, according to an example embodiment. The method 1600 is processed on at least one processor of a modular recycling device.

In an embodiment, the modular recycling device is the modules 110, 120, 130, 150, 135, 151-155, 161-165, and 170. In an embodiment, the modular recycling device is integrated into a SST. In an embodiment, the SST is an ATM. In an embodiment, the SST is operated in a customer-assistance mode of operation by a clerk as a POS terminal.

In an embodiment, the method 1600 performs the message and note processing described above with the FIGS. 1-10.

At 1610, the method 1600 organizes media handling modules (110, 120, 130, 150, 135, 151-155, 161-165, and 170) as a wired-network that is self-contained within a transaction terminal.

In an embodiment, at 1611, the method 1600 configures the wired network as a self-contained intranet of the modular recycling device.

At 1620, the method 1600 processes media items through the media handling modules as a modular recycling device.

According to an embodiment, at 1621, the method 1600 provides each media item at each media handling module a verification message.

In an embodiment of 1621 and at 1622, the method 1600 activates and deactivates electromechanical components associated with each media handling module with each media item.

At 1630, the method 1600 verifies, through communications provided over the wired network, each operation performed on each of the media handling modules for each of the media items.

In an embodiment, at 1631, the method 1600 processes the communications through cryptographic verification with each operation performed on each of the media handling modules for each of the media items.

In an embodiment, at 1632, the method 1600 produces, by each media handling module, an identification and verification message after that media handling module handles each of the media items.

Figure 17:
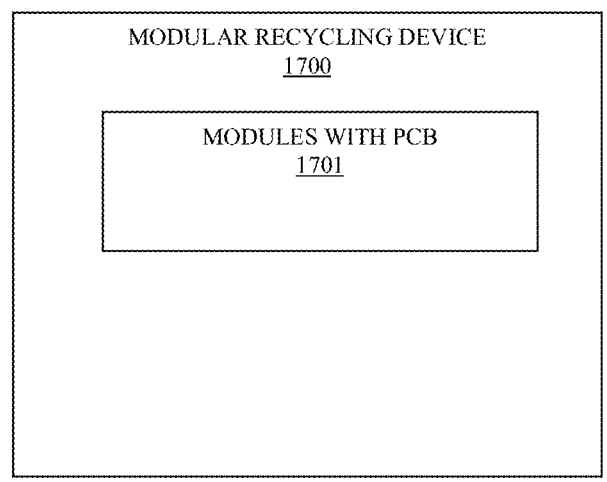
FIG. 17 is a diagram of a modular media recycling device, according to an example embodiment.

FIG. 17 is a diagram of a modular media recycling device 1600, according to an example embodiment. The modular media recycling device 1600 processes valuable media and includes a variety of hardware components, some of which were discussed above with reference to the FIGS. 1-10.

In an embodiment, the modular media recycling device 1700 are the modules 110, 120, 130, 150, 135, 151-155, 161-165, and 170.

In an embodiment, the modular media recycling device 1700 is integrated into a media transaction terminal. In an embodiment, the media transaction terminal is a SST. In an embodiment, the SST is an ATM. In an embodiment, the SST is a kiosk. In an embodiment, the media transaction terminal is a POS terminal.

The modular media recycling device 1700 includes a plurality of modules 1701. Each module including a PCB and at least one hardware processor.

The modules 1702 are each configured to: i) activate electromechanical components to handle valuable media being processed with a transaction through the modular recycling device 1700, ii) validate received security message from a previous module 1701 that handled the valuable media for the transaction, and iii) generate unique security messages that are independently validated by next modules 1701 that are to handle the valuable media for the transaction.

Figure 18:
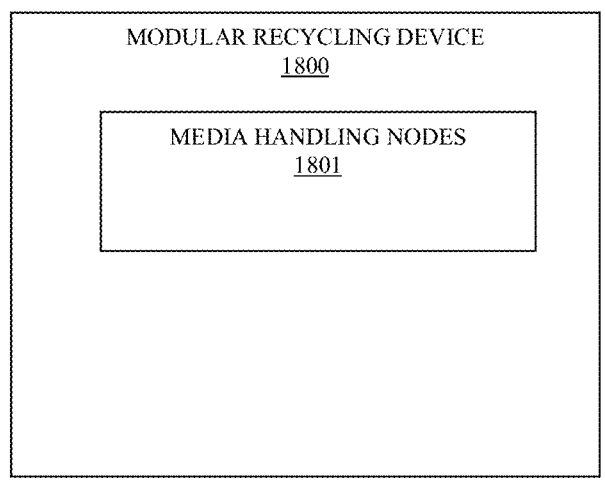
FIG. 18 is a diagram of modular valuable media recycling device, according to an example embodiment.

FIG. 18 is a diagram of another modular media recycling device 1800, according to an example embodiment. The modular media recycling device 1800 processes valuable media and includes a variety of hardware components, some of which were discussed above with reference to the FIGS. 1-10.

The modular media recycling device 1800 includes a plurality of media handling nodes 1801 (110, 120, 130, 150, 135, 151-155, 161-165, and 170). Each media handling node 1801 configured to: i) communicate with remaining nodes 1801, ii) control electromechanical components of that media handling node during a transaction associated with at least one media item, iii) verify communications from remaining nodes 1801, and iv) provide verification from that media handling node to the remaining nodes 1801 after processing the at least one media item of the transaction.

In an embodiment, the modular media recycling device 1800 is integrated into an ATM to process the transaction as a currency deposit being made at the ATM or a currency withdrawal being requested at the ATM.

Figure 19:
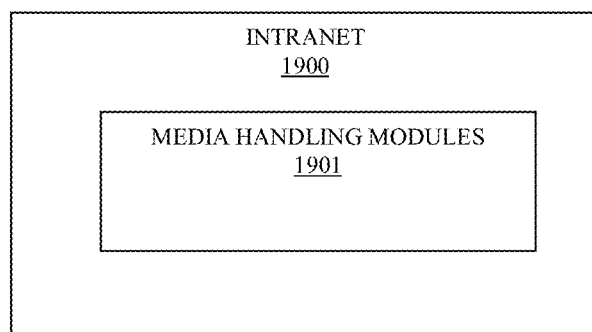
FIG. 19 is a diagram of still another modular media recycling device, according to an example embodiment.

FIG. 19 is a diagram of still another modular media recycling device 1900, according to an example embodiment. The modular media recycling device 1700 processes valuable media and includes a variety of hardware components, some of which were discussed above with reference to the FIGS. 1-10.

The intranet 1901 configured to provide communications in a self-contained network within the modular recycling device 1900.

The modular media recycling device 1900 includes an intranet 1901 and a plurality of media handling nodes 1901 (110, 120, 130, 150, 135, 151-155, 161-165, and 170). The media handling nodes 1801 configured to: i) generate some of the communications, ii) verify other of the communications, iii) activate electromechanical components to handle media items being processed through the modular recycling device 1900, and iv) cooperate to processing the media items for transactions being performed on a transaction terminal.

In an embodiment, the modular recycling device is integrated into the transaction terminal for performing deposit and withdrawal transactions on the transaction terminal.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   wiring a plurality of modules of a composite device representing a modular recycling device as a secure device-level Intranet, each module of the modular recycling device comprising a processor and corresponding executable instructions that cause the corresponding processor to perform secure message passing within the secure device-level Intranet as processed media items are moved through the modules of the modular recycling device:
   wherein the modules comprise:
      a pocket infeed module that receives deposited media items within the modular recycling device or ejects dispensed media items from the modular recycling device;
      a pocket feeder stacker module that receives a bunch of deposited media items within the modular recycling device from the pocket infeed module or stacks a plurality of the dispensed media items into a bunch of dispensed media for ejection through the pocket infeed module;

a centralizer module that centralizes transported media items along a transport path within the modular recycling device and delivers each transported media item to a validation module;

the validation module that performs media item identification, media item validation on each transported media item and delivers each transported media item to an escrow module;

the escrow module that temporarily holds the transported media items until validated or authenticated by the validation module and delivers released media items that are validated to an upper transport module, and wherein the escrow module further comprises a temporary escrow that holds damaged or counterfeit transported media items and directs the damaged or counterfeit transported media items to an exception cassette module;

the upper transport module that sends each transported media item associated with the deposited media items along the transport path to a lower transport module, and wherein the upper transport module receives each transported media item associated with the dispensed media items from the lower transport module and sends the corresponding transported media item to the pocket feeder stacker module;

the lower transport module that sends each transported media item received from the upper transport module to a corresponding feeder-stacker module associated with a corresponding cassette module, and wherein the lower transport module receives each transported media item associated with the dispensed media items from a corresponding feeder-stacker module and sends the corresponding transported media item to the upper transport module;

feeder-stacker modules that sends each transported media item received from the lower transport module to cassette modules or that receives each transported media item associated with the dispensed media items from a corresponding cassette module to the lower transport module;

cassette modules that store each transported media item received from a corresponding feeder-stacker module or that provides each transported media item associated with the dispensed media items to a corresponding feeder-stacker module; and the exception cassette module that stores the damaged or counterfeit transported media items received from the temporary escrow of the escrow module;

generating a security message when an item of media is detected at a sensor of a modular recycling device, wherein generating further includes including a module identifier within the security message;

processing the item; and forwarding the item within the modular recycling device with the security message for downstream processing associated with the item by moving the item to a next module and providing the security message to the next module through the secure device-level Intranet, wherein each module associated with the downstream processing receives the security message with the item during processing of the item.

2. The method of claim 1, wherein generating further includes encrypting the security message with cryptographic operations.

3. The method of claim 1, wherein generating further includes generating the security message in response to receiving a different security message already associated with the item.

4. The method of claim 3, wherein generating further includes authenticating the different security message before generating the security message.

5. The method of claim 4, wherein authenticating further includes processing cryptographic operations to verify that a previous module that processed the item generated and provided the different security message.

6. The method of claim 1, wherein generating further includes receiving the item from a transport track that moves the item through the modular recycling device in accordance with a transaction being processed on a Self-Service Terminal (SST) having the modular recycling device integrated therein.

7. The method of claim 1, wherein processing further includes performing data operations in accordance with a transaction being processed that is associated with the item.

8. The method of claim 1, wherein forwarding further includes instructing electromechanical components of the modular recycling device to activate and deactivate to forward the item within the modular recycling device for the downstream processing.

9. A method, comprising:

receiving a currency note (note) along a transport path within a modular recycling device associated with a transaction being processed on a transaction terminal;

obtaining a first security message over a secure-device level Intranet defined within the modular recycling device between modules of the modular recycling device, wherein the first security message comprises a first module identifier associated with the corresponding module that generated the first security message;

validating a first security message associated with the note;

performing at least one operation on the note based on the transaction;

generating a second security message for the note, wherein the second security message comprising a second module identifier associated with the corresponding module that performs the generating; and associating the second security message with the note within the secure-device level Intranet for subsequent processing related to the transaction; and processing the method on each of the modules within the modular recycling device for deposited and dispensed notes;

wherein the modules comprising:

a pocket infeed module that receives the deposited notes within the modular recycling device or ejects the dispensed notes from the modular recycling device;

a pocket feeder stacker module that receives a bunch of deposited notes within the modular recycling device from the pocket infeed module or stacks a plurality of the dispensed notes into a bunch of dispensed notes for ejection through the pocket infeed module;

a centralizer module that centralizes transported notes along a transport path within the modular recycling device and delivers each transported note to a validation module;

the validation module that performs media item identification, media item validation on each transported note and delivers each transported note to an escrow module;

the escrow module that temporarily holds the transported notes until validated or authenticated by the validation module and delivers released notes that are validated to an upper transport module, and wherein the escrow module further comprises a temporary escrow that holds damaged or counterfeit transported notes and directs the damaged or counterfeit transported notes to an exception cassette module;

the upper transport module that sends each transported note associated with the deposited notes along the transport path to a lower transport module, and wherein the upper transport module receives each transported note associated with the dispensed notes from the lower transport module and sends the corresponding transported note to the pocket feeder stacker module;

the lower transport module that sends each transported note received from the upper transport module to a corresponding feeder-stacker module associated with a corresponding cassette module, and wherein the lower transport module receives each transported note associated with the dispensed notes from a corresponding feeder-stacker module and sends the corresponding transported note to the upper transport module;

feeder-stacker modules that sends each transported note received from the lower transport module to cassette modules or that receives each transported note associated with the dispensed notes from a corresponding cassette module to the lower transport module;

cassette modules that store each transported note received from a corresponding feeder-stacker module or that provides each transported note associated with the dispensed notes to a corresponding feeder-stacker module; and the exception cassette module that stores the damaged or counterfeit notes received from the temporary escrow of the escrow module.

10. The method of claim 9, wherein validating further includes verifying that the note was last processed by a module of the modular recycling device that is authentic and secure.

11. The method of claim 9, wherein validating further includes processing cryptographic operations on a secure processor and validating cryptographic data associated with the first security message.

12. The method of claim 9, wherein performing further includes activating at least one electromechanical component of the modular recycling device.

13. The method of claim 9, wherein generating further includes encrypting the second module identifier with a cryptographic key and including an encrypted second module identifier in the second security message.

14. The method of claim 13, wherein encrypting further includes inserting a current date and time stamp into the second security message.

15. The method of claim 13, wherein inserting further includes digitally signing the second security message.

16. The method of claim 9, wherein associating further includes sending the second security message to a next processing node that is to handle the note within the modular recycling device.

17. A modular recycling device, comprising:

a plurality of modules each module including a Printed Circuit Board (PCB) and at least one hardware processor, wherein the modules are wired together as a secure device-level Intranet for communication using secure messages passed within the secure device-level Intranet;

wherein the modules are configured to: i) activate electromechanical components to handle valuable media being processed with a transaction through the modular recycling device, ii) validate received security message from a previous module that handled the valuable media for the transaction through the secure device-level Intranet, and iii) generate unique security messages that are independently validated by next modules that are to handle the valuable media for the transaction over the secure device-level Intranet, wherein each unique security message comprising a module identifier for the corresponding module that generated the corresponding unique security message;

wherein the modules comprise:

a pocket infeed module that receives deposited media items within the modular recycling device or ejects dispensed media items from the modular recycling device;

a pocket feeder stacker module that receives a bunch of deposited media items within the modular recycling device from the pocket infeed module or stacks a plurality of the dispensed media items into a bunch of dispensed media for ejection through the pocket infeed module;

a centralizer module that centralizes transported media items along a transport path within the modular recycling device and delivers each transported media item to a validation module;

the validation module that performs media item identification, media item validation on each transported media item and delivers each transported media item to an escrow module;

the escrow module that temporarily holds the transported media items until validated or authenticated by the validation module and delivers released media items that are validated to an upper transport module, and wherein the escrow module further comprises a temporary escrow that holds damaged or counterfeit transported media items and directs the damaged or counterfeit transported media items to an exception cassette module;

the upper transport module that sends each transported media item associated with the deposited media items along the transport path to a lower transport module, and wherein the upper transport module receives each transported media item associated with the dispensed media items from the lower transport module and sends the corresponding transported media item to the pocket feeder stacker module;

the lower transport module that sends each transported media item received from the upper transport module to a corresponding feeder-stacker module associated with a corresponding cassette module, and wherein the lower transport module receives each transported media item associated with the dispensed media items from a corresponding feeder-stacker module and sends the corresponding transported media item to the upper transport module;

feeder-stacker modules that sends each transported media item received from the lower transport module to cassette modules or that receives each transported media item associated with the dispensed media items from a corresponding cassette module to the lower transport module;

cassette modules that store each transported media item received from a corresponding feeder-stacker module or that provides each transported media item associated with the dispensed media items to a corresponding feeder-stacker module; and the exception cassette module that stores the damaged or counterfeit transported media items received from the temporary escrow of the escrow module.

18. The modular recycling device of claim 17, wherein the modular recycling device is integrated into a media transaction terminal.

* * * * *